July 18, 1939.  C. J. JENNY  2,166,595
TEMPERATURE COMPENSATED INDICATING INSTRUMENT
Filed May 21, 1937
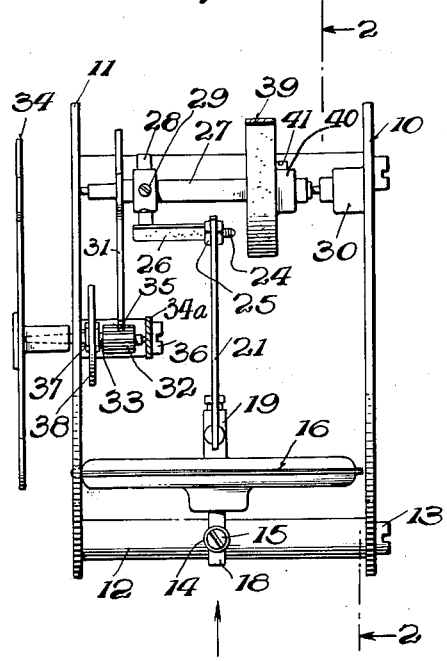
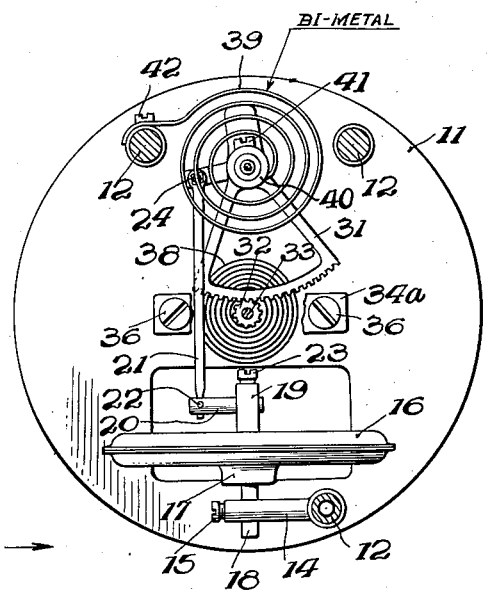
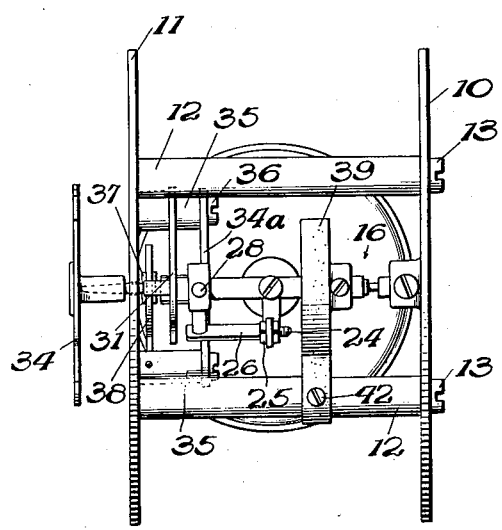
Inventor
Cletus J. Jenny.
By Stephen Cerstvik
Attorney Patented July 18, 1939

2,166,595

UNITED STATES PATENT OFFICE 2,166,595

TEMPERATURE COMPENSATED INDICATING INSTRUMENT

Cletus J. Jenny, East Orange, N. J., assignor to Bendix Aviation Corporation, South Bend, Ind., a corporation of Delaware Application May 21, 1937, Serial No. 144,095

3 Claims. (Cl. 73—4)

The present invention relates to improvements in indicating instruments, and more particularly to means for compensating the effect of temperature upon an indicating instrument and to correct or eliminate backlash and other sources of error in such instruments.

Instruments utilizing expansible or resilient elements as their actuating means are subject to various sources of error. Upon a change in temperature for instance, the modulus of elasticity of the material used in the expanding or resilient element changes, thereby causing error. Also upon a change in temperature the various elements of the mechanism change in physical dimension thereby affecting the indication of the instrument.

In addition to errors due to temperature change, undesirable backlash may exist between the various elements of the mechanism thereby reducing the precision of the instrument. This is particularly true in instruments where a high magnification of the force produced by the expanding or resilient element is used, such as in sensitive altimeters.

In addition to the difficulties enumerated above, high precision instruments are also subject to vibration whereby an oscillation of the indicating element occurs and other undesirable results ensue.

Accordingly, one of the objects of the present invention is to provide novel means in an indicating or measuring instrument whereby the foregoing undesirable characteristics are eliminated.

A further object is to provide novel means in an indicating or measuring instrument whereby errors due to changes in physical dimensions with changes in temperature are compensated.

Still a further object is to provide novel means whereby backlash is eliminated.

A still further object is to provide novel means whereby errors due to vibration are reduced throughout the operating range.

Still another object is to provide a novel means for producing a compensating effect wherein the compensating force is applied tangentially to an element whereby the lever arm of the force is maintained substantially constant upon relative movement of the elements of the instrument.

The above and further objects and advantages of the invention will appear more fully hereinafter from a consideration of the detailed description which follows, taken together with the accompanying drawing wherein is illustrated one embodiment of the invention. It is to be expressly understood, however, that the drawing is for the purpose of illustration and description only and is not designed as a definition of the limits of the invention, reference being had for this purpose to the appended claims.

In the drawing wherein like reference characters refer to like parts throughout the several views:

Fig. 1 is a side elevation, partly in section, of one form of device embodying the invention;

Fig. 2 is a view taken along the line 2—2 of Fig. 1; and

Fig. 3 is a plan view of the device as shown in Fig. 1.

Referring to the drawing wherein the invention is illustrated as applied to an altimeter, the operating mechanism of the altimeter is shown mounted on a frame of any suitable type which, in the present embodiment, comprises a rear frame member or plate 10 and a face plate 11, said plates being held in spaced relation by spacers 12 and screws 13.

Mounted on bottom spacer 12 by means of hollow rod 14 and screw 15, as shown in Fig. 2, is diaphragm 16, the lower side 17 of which has a rod 18 attached thereto and passing through hollow rod 14 in which it is locked in place by screw 15. Adjustably mounted in center post 19 on the other side of said diaphragm is rod 20 to which is pivoted one end of link 21 by pin 22. Screw 23 fastens the rod 20 in place after it has been properly adjusted. Rotatably connected to the other end of link 21 by means of threaded pin 24 and nuts 25 (see Fig. 1) is a bi-metal element 26 which is adjustably mounted on rockshaft 27 by means of rod 28 slidably mounted in said rockshaft and locked in adjusted position therein by screw 29.

Bi-metal element 26 is constructed of two different metals in a manner well known in the art the plane of whose mounting surfaces is normal to the axis of rod 28 while the axis of said bi-metal element is parallel to the axis of rockshaft 27. Upon expansion and contraction of the bi-metal element the effective lever arm between the link 21 and the rockshaft 27 is varied.

With changes in temperature, the modulus of elasticity of the diaphragm or other expanding or resilient element changes. This change is indicated by a coefficient called the temperature coefficient of the modulus of elasticity. Upon a change in the modulus of elasticity, for a given increment in pressure a different increment of expansion of the diaphragm or resilient element is produced at different temperatures. In order to compensate for this change the bi-metal element is designed so that such change in expansion of the diaphragm will be compensated by a change in the effective lever arm between the bi-metal element and the rockshaft.

If the diaphragm is constructed of an ordinary metal having a negative temperature coefficient of modulus of elasticity, upon a decrease in temperature the amount of expansion of said diaphragm for a certain increment of pressure will be reduced from what it would be at a higher temperature. This reduction in expansion would be indicated by a reduced movement of the pointer. In order to compensate for said reduction, the bi-metal element is so designed that it bends towards the rockshaft with a decrease in temperature thereby reducing the lever arm between said bi-metal element and said rockshaft. By the reduction of said lever arm the point of application of the force due to the expanding diaphragm, namely, the upper end of link 21, travels in a circular path of smaller radius whose center is the center of the rockshaft. A smaller expansion of diaphragm 16, therefore, is changed to an increased angular rotation of rockshaft 27 and such increased angular rotation is transmitted to the pointer thereby offsetting the reduced movement of the pointer due to the lesser expansion of the diaphragm at said lower temperature. The bi-metal element 26 is mounted on the slidable rod 28 so that the initial lever arm between the bi-metal element and the rockshaft can be accurately adjusted thereby enabling the adjustment of said lever arm to provide means whereby the most effective compensation can be produced, without injury to the bi-metal strip 26 or any impairment of the functions thereof.

Rockshaft 27 is mounted for rotation by extensions thereof, one of which is journaled in boss 30 formed on back plate 10 and the other of which is journaled in front plate 11.

Mounted on rockshaft 27 adjacent rod 28 is sector gear 31 meshing with pinion 32 mounted for rotation with shaft 33 carrying pointer 34 at one end thereof. Shaft 33 is journaled at one end in plate 34a mounted on front plate 11 by spacers 35 and screws 36 and is journaled adjacent its other end in front plate 11.

The novel means of the invention are now provided and for this purpose there is attached to shaft 33 a collar 37 to which is fastened one end of a small spiral spring 38 the other end of which is connected to one of the spacers 35 as shown in Fig. 3. Also mounted on rockshaft 27 is large spiral spring 39 (see Fig. 2) whose connection to said rockshaft is similar to the connection of spring 38 to shaft 33 by means of collar 37 on said shaft 33 and which will now be set out in more detail.

Collar 40, best shown in Fig. 2, is mounted on rockshaft 27 and secured thereto by screw 41. Connected to said collar and adjacent said screw 41 is one end of said spring 39. This end of spring 39 is connected tangentially to said collar 40 whereby the effective lever arm of the force exerted by the spring on the rockshaft is maintained substantially constant regardless of the angular rotation of said rockshaft. By this tangential connection the torque exerted by the spring 39 is made constant throughout the range of the instrument. The spiral spring can be set to give positive or negative torque, but no change from positive to negative torque. Thus the link 21 is constantly under tension or compression but does not change from one to the other whether the instrument is going from its zero reading to the maximum reading or back from the maximum reading to the zero reading. There is, therefore, no lost motion in the pin joints of the link and readings going up the scale all correspond to readings coming down the scale. The application of the spring force tangentially to the collar maintains this torque constant throughout the entire range of the instrument.

Spiral spring 39 is connected to the frame of the instrument by being fastened to one of the upper spacers 12 through screw 42. Due to the fact that the spiral spring is so attached and by exerting a load on the diaphragm 16, oscillation due to vibration is greatly reduced and this reduction is made throughout the range of the instrument.

The small spiral spring 38 is attached to collar 37 in the same manner as spring 39 is connected to collar 40 and therefore exerts a constant torque on the shaft 33 throughout the range of the instrument and maintains the same surfaces of the teeth of the pinion 32 and sector gear 31 in contact thereby eliminating backlash between the rockshaft and pointer and further reducing vibration throughout the range of the instrument.

In the present embodiment, the spiral spring 39 is constructed of suitable bi-metal whereby it is possible to compensate for any shifts of zero reading due to temperature effects. At a constant temperature the bi-metal spring, mounted as shown, exerts a uniform torque thereby loading the diaphragm. With a change in temperature the torque of the bi-metal spiral spring changes causing a displacement of the diaphragm. By properly choosing the materials and size of the bi-metallic spring it can be designed so that the torque will increase or decrease by desired amounts with an increase in temperature. If an increase in temperature changes the physical dimensions of the elements of the operating mechanism so that the indication of the pointer has a plus error the bi-metallic spiral spring is so designed that the change in torque at the increase of temperature will change the load exerted on the diaphragm in such a manner and in such magnitude that an equal negative error will be introduced. This nullifies the error due to the temperature effect.

The operation of the device is as follows: When the diaphragm element 16 expands due for instance to a decrease in pressure on the outside thereof, link 21 is moved upwardly to actuate the bi-metal element 26 to thereby rotate rockshaft 27. The effective lever arm between the bi-metal element and the rockshaft is varied by temperature changes thereby offsetting changes in the expansion of the diaphragm 16 due to changes in temperature affecting its modulus of elasticity. Changes in the physical dimensions of the elements of the operating mechanism due to changes in temperature or, in other words, the zero compensation, is effected by changes in torque of the bi-metal spiral spring 39. Bi-metal spring 39 also applies a uniform torque to the rockshaft whereby the elements between said rockshaft and the diaphragm are either under tension or compression and all backlash is eliminated. Also the load placed by the spiral spring 39 on the diaphragm and its connection between the movable and stationary parts of the instrument reduce vibration of the movable elements and the attachment of the spring 39 tangentially to the collar 40 applies a uniform torque throughout the range of the instrument. The movement transmitted to the rockshaft rotates the sector gear 31 thereby rotating pinion 32 and shaft 33 to rotate the pointer 34. Small spiral spring 38 prevents backlash between the pointer and the rockshaft, reduces vibration and by means of its attachment to collar 37, applies a corrective torque of constant value throughout the range of the instrument.

Means are therefore provided whereby errors due to temperature are compensated, backlash and oscillation due to vibration are reduced, the most efficient setting for proper compensation can be accurately determined and set and the corrective forces made constant throughout the range of the instrument.

Although but one embodiment of the invention has been illustrated and described, further changes and modifications in form, materials and relative arrangement of parts, which will now appear to those skilled in the art, may be made without departing from the scope of the invention. Reference is, therefore, to be had to the appended claims for a definition of the limits of the invention.

What is claimed is:

1. In a precision indicating device, a framework, an expansible element mounted in said framework, a rockshaft, means connecting said expansible element to said rockshaft, an indicating element, means connecting said indicating element to said rockshaft, a bi-metal spiral spring tangentially connected at one end thereof to said rockshaft and to the framework at the other end thereof, and a second coil spring having one end connected to said framework and the other end to said connecting means between said indicating element and said rockshaft.

2. In a precision indicating device, an expansible element, an indicating element, means including a rockshaft transmitting the motion of said expansible element to said indicating element, and means comprising a bi-metal spiral spring independent of the motion transmitting means, with one end thereof fixedly secured and the other end connected to said rockshaft and applying a torque to said rockshaft, constant for all positions of said rockshaft and varying only with temperature whereby temperature errors in said indicating device are properly compensated.

3. In a device of the character described, an expansible element, a rock-shaft connected to said expansible element, a bi-metallic spiral spring having one end thereof tangentially connected to said rock-shaft for rotation therewith, the other end of said spring being immovably held, an indicating element, and means transmitting the rotation of said rock-shaft to said indicating element.

CLETUS J. JENNY.